US011117228B2

(12) United States Patent
Kikuchi et al.

(10) Patent No.: US 11,117,228 B2
(45) Date of Patent: Sep. 14, 2021

(54) MANUFACTURING METHOD AND MANUFACTURING APPARATUS

(71) Applicant: SUBARU CORPORATION, Tokyo (JP)

(72) Inventors: Marosuke Kikuchi, Tokyo (JP); Yoshiyuki Matsumoto, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 178 days.

(21) Appl. No.: 16/149,288

(22) Filed: Oct. 2, 2018

(65) Prior Publication Data
US 2019/0160607 A1 May 30, 2019

(30) Foreign Application Priority Data
Nov. 29, 2017 (JP) .............................. JP2017-229674

(51) Int. Cl.
B23P 19/04 (2006.01)
G01B 5/14 (2006.01)
(Continued)

(52) U.S. Cl.
CPC ................ B23P 19/04 (2013.01); B64F 5/10 (2017.01); G01B 5/14 (2013.01); G05B 19/41805 (2013.01); G05B 2219/45071 (2013.01)

(58) Field of Classification Search
CPC ...... B23P 19/04; B64F 5/10; G05B 19/41805; G05B 2219/45071; G01B 5/14;
(Continued)

(56) References Cited

U.S. PATENT DOCUMENTS 5,956,251 A 9/1999 Atkinson et al.
10,317,886 B1* 6/2019 Arthur .................. G01B 11/24
(Continued)

FOREIGN PATENT DOCUMENTS

CN 102666273 a 9/2012
EP 2 533 167 A2 12/2012
(Continued)

OTHER PUBLICATIONS

Notice of Reasons for Refusal issued in corresponding Japanese Patent Application No. 2017-229674 dated Nov. 19, 2019, with machine translation.
(Continued)

Primary Examiner — Saran G Afzali
Assistant Examiner — Darrell C Ford
(74) Attorney, Agent, or Firm — Troutman Pepper Hamilton Sanders LLP

(57) ABSTRACT

A manufacturing method includes deriving, from statistic data, a representative value of a clearance provided between first and second workpieces, executing a first insertion process, and executing a second insertion process. The statistic data is obtained from measuring the clearance. The executing the first insertion process includes testing insertion of a tolerance shim into the clearance when the representative value is less than a tolerance of the clearance, and testing insertion of a double-tolerance jig into the clearance when the tolerance shim is insertable into the clearance. The executing the second insertion process includes testing insertion of a difference shim into the clearance when the representative value is greater than the tolerance, testing insertion of a representative shim into the clearance when the difference shim is insertable into the clearance, and testing insertion of an addition jig into the clearance when the representative shim is insertable into the clearance.

12 Claims, 7 Drawing Sheets

(51) Int. Cl.
G05B 19/418 (2006.01)
B64F 5/10 (2017.01)

(58) Field of Classification Search
CPC .............. Y02P 90/04; Y10T 29/49826; Y10T 29/49764; Y10T 29/49771; Y10T 29/49616; Y10T 29/49622
USPC .............. 29/428, 407.01, 407.05, 897, 897.2
See application file for complete search history.

(56) References Cited

U.S. PATENT DOCUMENTS

| | | | |
|---|---|---|---|
| 2008/0205763 A1 | 8/2008 | Marsh et al. | |
| 2008/0256788 A1* | 10/2008 | Glazebrook | B64F 5/10 29/700 |
| 2011/0168840 A1 | 7/2011 | Lopez et al. | |
| 2011/0271509 A1* | 11/2011 | Willdig | B64C 3/26 29/428 |
| 2013/0186552 A1 | 7/2013 | Asahara et al. | |
| 2013/0264422 A1 | 10/2013 | Lopez et al. | |
| 2015/0294032 A1 | 10/2015 | Lagally et al. | |
| 2017/0132355 A1* | 5/2017 | Vasquez | B64C 1/26 |
| 2017/0327201 A1* | 11/2017 | Doyle | G01B 11/14 |
| 2021/0118126 A1* | 4/2021 | Valenzuela | H04N 5/247 |
| 2021/0130010 A1* | 5/2021 | Charlton | B64C 1/10 |

FOREIGN PATENT DOCUMENTS

| | | |
|---|---|---|
| JP | 2015-215337 A | 12/2015 |
| JP | 5931458 B | 6/2016 |

OTHER PUBLICATIONS

Extended European Search Report issued in corresponding European Patent Application No. 18202793.8 dated Apr. 18, 2019.

Ehmke, F., et al. "Single Step Shimming Solution for Automated Aircraft Assembly" 13th IEE Conference on Automation Science and Engineering (CASE), 662-667(Aug. 20-23, 2017), XP033299320 cited in EESR issued in corresponding EP Appln No. 18202793.8 dated Apr. 18, 2019.

Manohar, K., et al. "Predicting shim gaps in aircraft assembly with machine learning and sparse sensing" 1-13 (Nov. 24, 2017), retrieved from the Internet: URL: https://arxiv.org/pdf/1711.08861.pdf, XP055579146 cited in EESR issued in corresponding EP Appln No. 18202793.8 dated Apr. 18, 2019.

* cited by examiner

MANUFACTURING METHOD AND MANUFACTURING APPARATUS

CROSS-REFERENCE TO RELATED APPLICATIONS

The present application claims priority from Japanese Patent Application No. 2017-229674 filed on Nov. 29, 2017, the entire contents of which are hereby incorporated by reference.

BACKGROUND

The technology relates to a manufacturing method and a manufacturing apparatus that fasten workpieces that eventually structure an airframe of an aircraft.

Manufacturing an aircraft involves operations including fastening a first workpiece and a second workpiece. The first workpiece and the second workpiece are fastened by a fastener that penetrates the first workpiece and the second workpiece. For example, reference is made to Japanese Patent No. 5931458.

SUMMARY

An aspect of the technology provides a manufacturing method that includes: deriving, from statistic data, a representative value of a clearance that is provided between a first workpiece and a second workpiece, in which the first workpiece and the second workpiece eventually structure an airframe of an aircraft and are configured to be fastened to each other, and the statistic data is obtained from measuring the clearance; executing a first insertion process that includes testing insertion of a tolerance shim into the clearance when the representative value is less than a tolerance of the clearance, in which the tolerance shim has a thickness corresponding to the tolerance, and testing insertion of a double-tolerance jig into the clearance when the tolerance shim is insertable into the clearance in the testing the insertion of the tolerance shim, in which the double-tolerance jig has a thickness twice the tolerance; and executing a second insertion process that includes testing insertion of a difference shim into the clearance when the representative value is greater than the tolerance, in which the difference shim has a thickness corresponding to a resultant of subtraction of the tolerance from the representative value, testing insertion of a representative shim into the clearance when the difference shim is insertable into the clearance in the testing the insertion of the difference shim, in which the representative shim has a thickness corresponding to the representative value, and testing insertion of an addition jig into the clearance when the representative shim is insertable into the clearance in the testing the insertion of the representative shim, in which the addition jig has a thickness corresponding to a resultant of addition of the tolerance to the representative value.

An aspect of the technology provides a manufacturing apparatus that includes: a representative value deriving unit configured to derive, from statistic data, a representative value of a clearance that is provided between a first workpiece and a second workpiece, in which the first workpiece and the second workpiece eventually structure an airframe of an aircraft and are configured to be fastened to each other, and the statistic data is obtained from measuring the clearance; a first tester configured to test insertion of a tolerance shim into the clearance when the representative value derived by the representative value deriving unit is less than a tolerance of the clearance, and test insertion of a double-tolerance jig into the clearance when the tolerance shim is insertable into the clearance, in which the tolerance shim has a thickness corresponding to the tolerance, and the double-tolerance jig has a thickness twice the tolerance; and a second tester configured to test insertion of a difference shim into the clearance when the representative value is greater than the tolerance, test insertion of a representative shim into the clearance when the difference shim is insertable into the clearance in the testing of the insertion of the difference shim, and test insertion of an addition jig into the clearance when the representative shim is insertable into the clearance in the testing of the insertion of the representative shim, in which the difference shim has a thickness corresponding to a resultant of subtraction of the tolerance from the representative value, the representative shim has a thickness corresponding to the representative value, and the addition jig has a thickness corresponding to a resultant of addition of the tolerance to the representative value.

An aspect of the technology provides a manufacturing apparatus that includes circuitry configured to derive, from statistic data, a representative value of a clearance that is provided between a first workpiece and a second workpiece, in which the first workpiece and the second workpiece eventually structure an airframe of an aircraft and are configured to be fastened to each other, and the statistic data is obtained from measuring the clearance, test insertion of a tolerance shim into the clearance when the representative value is less than a tolerance of the clearance, in which the tolerance shim has a thickness corresponding to the tolerance, test insertion of a double-tolerance jig into the clearance when the tolerance shim is insertable into the clearance, in which the double-tolerance jig has a thickness twice the tolerance, test insertion of a difference shim into the clearance when the representative value is greater than the tolerance, in which the difference shim has a thickness corresponding to a resultant of subtraction of the tolerance from the representative value, test insertion of a representative shim into the clearance when the difference shim is insertable into the clearance in the testing of the insertion of the difference shim, in which the representative shim has a thickness corresponding to the representative value, and test insertion of an addition jig into the clearance when the representative shim is insertable into the clearance in the testing of the insertion of the representative shim, in which the addition jig has a thickness corresponding to a resultant of addition of the tolerance to the representative value.

DETAILED DESCRIPTION

Figure 1A:
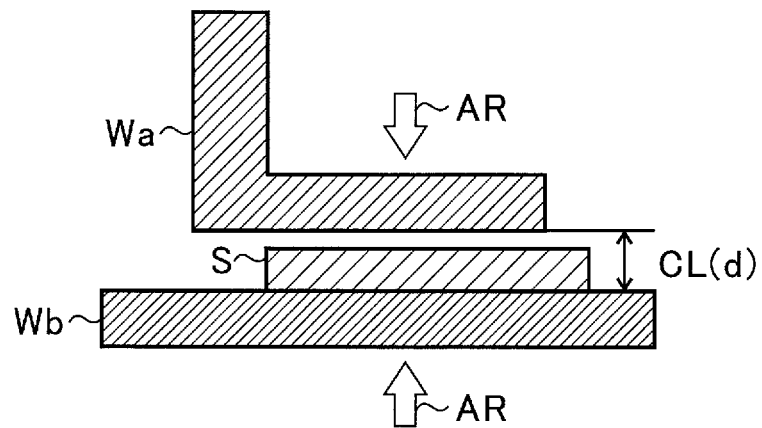
FIG. 1A is a cross-sectional view of a first workpiece, a second workpiece, and a shim during an operation process performed on the first workpiece and the second workpiece in a manufacturing method according to one implementation of the technology.

In the following, some implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

Figure 1B:
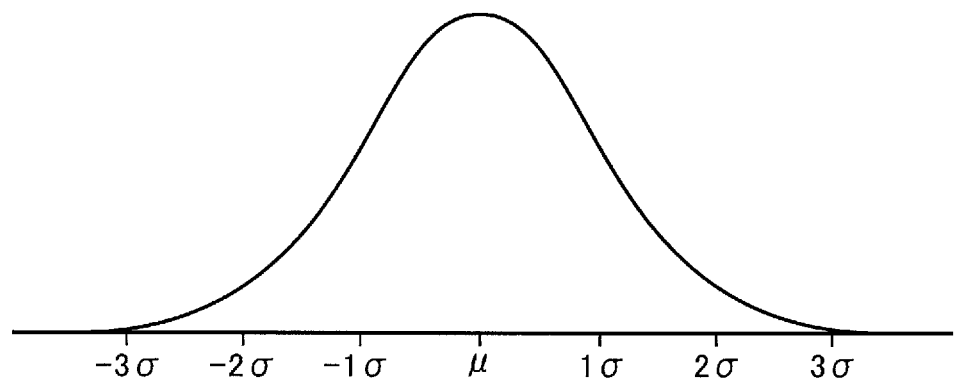
FIG. 1B is a graph illustrating an example of statistic data obtained as a result of measuring a length of a clearance between the first workpiece and the second workpiece illustrated in FIG. 1A.

FIGS. 1A and 1B each illustrate an operation process performed on a first workpiece Wa and a second workpiece Wb in a manufacturing method according to an example implementation of the technology, in which FIG. 1A is a cross-sectional view of the first workpiece Wa, the second workpiece Wb, and a shim S. FIG. 1B illustrates an example of statistic data obtained as a result of measuring a length of a clearance CL provided between the first workpiece Wa and the second workpiece Wb illustrated in FIG. 1A.

The first workpiece Wa and the second workpiece Wb eventually structure an airframe of an aircraft. The first workpiece Wa and the second workpiece Wb each may serve as a work object. The first workpiece Wa and the second workpiece Wb may be pressed by an unillustrated fastener in directions in which the first and the second workpieces Wa and Wb are brought close to each other (denoted by arrows AR in FIG. 1A) and thus fastened by the fastener. The fastener can be a bolt or any other fastening member.

Referring to FIG. 1A, when the first workpiece Wa and the second workpiece Wb are attached together, the clearance CL may possibly be formed between the first and the second workpieces Wa and Wb. Under such circumstances, tightening the first workpiece Wa and the second workpiece Wb by means of the fastener can eliminate the clearance CL. On the other hand, this may possibly result in deformation of the first workpiece Wa, the second workpiece Wb, or both, raising a concern of internal stress generated in the first workpiece Wa and the second workpiece Wb, especially in the field of aircrafts. Accordingly, a tolerance "d" set for the clearance CL between the first workpiece Wa and the second workpiece Wb may sometimes be small in the field of aircrafts. In other words, a ratio in magnitude of the tolerance d to a dimension tolerance of the first workpiece Wa, the second workpiece Wb, or both may possibly be smaller than that in any field other than the field of aircrafts. Hence, a dimensional error in the first workpiece Wa, the second workpiece Wb, or both may often cause the clearance CL to fall outside the tolerance d.

To suppress the internal stress of the first workpiece Wa and the second workpiece Wb, one measure may be to insert the shim S between the first workpiece Wa and the second workpiece Wb. In this case, the fastener may so fasten the first workpiece Wa and the second workpiece Wb as to penetrate the first workpiece Wa, the shim S, and the second workpiece Wb, for example. Unfortunately, forming the shim S for the clearance CL provided between the first workpiece Wa and the second workpiece Wb on an individual basis leads to an increase in operation man-hour.

It is desirable to provide a manufacturing method and a manufacturing apparatus that are able to reduce operation man-hour.

The example implementation uses the statistic data on the clearance CL illustrated by way of example in FIG. 1B. A graph illustrated in FIG. 1B may contain scale marks in a horizontal axis, in which the scale marks other than the scale mark corresponding to a median $\mu$ denote their respective relative values that are centered at the median $\mu$. The statistic data on the clearance CL illustrated in FIG. 1B may be based on an assumption that the clearances CL vary in accordance with a normal distribution. For example, roughly 68.27% of the clearances CL may fall within a $1\sigma$ interval (an interval from $-1\sigma$ to $1\sigma$) relative to the median roughly 95.55% of the clearances CL may fall within a $2\sigma$ interval (an interval from $-2\sigma$ to $2\sigma$) relative to the median and roughly 99.73% of the clearances CL may fall within a $3\sigma$ interval (an interval from $-3\sigma$ to $3\sigma$) relative to the median $\mu$. The median $\mu$ may be, for example, a representative value. Note that the example implementation illustrated in FIG. 1B uses the median $\mu$ as the representative value; however, the representative value of the clearances CL may be a mean value in an alternative example implementation.

Figure 2:
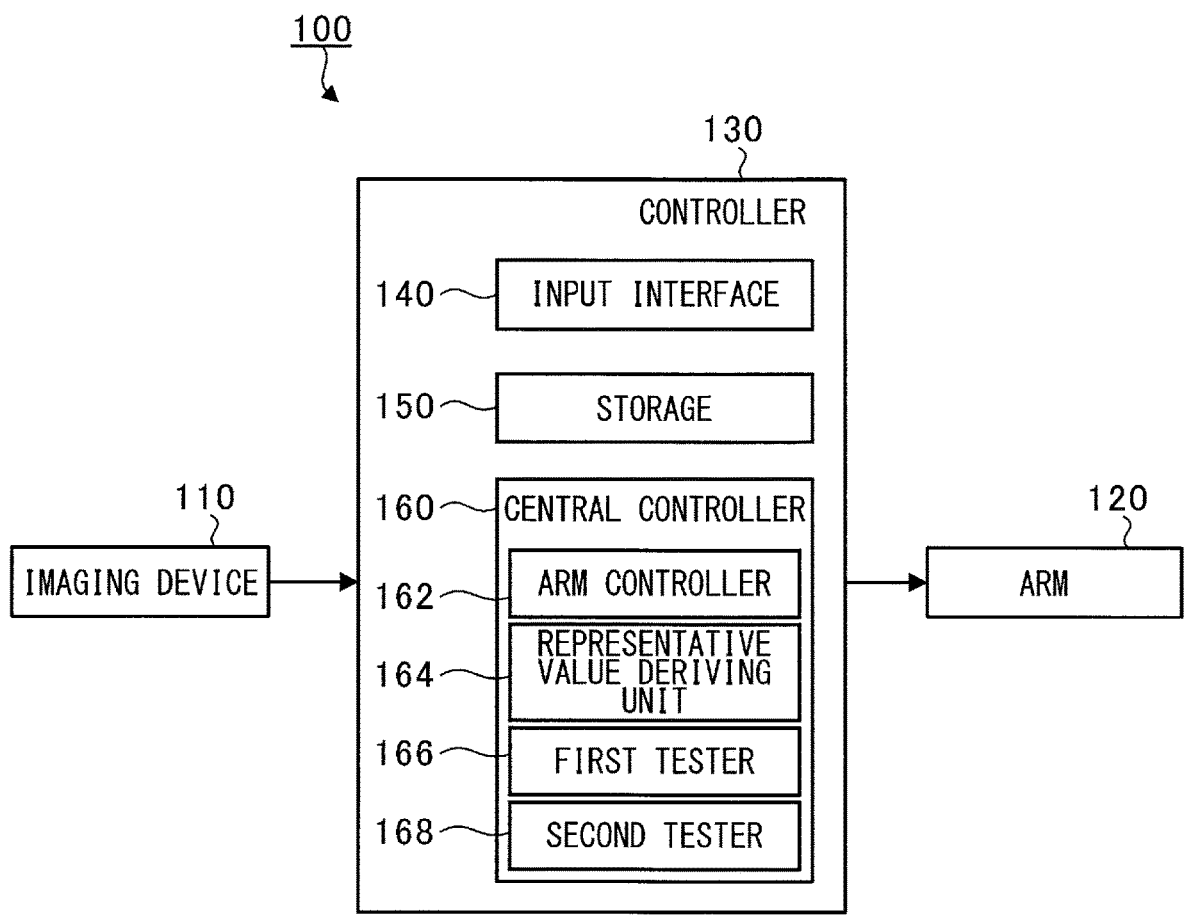
FIG. 2 is a block diagram illustrating an example of a configuration of a manufacturing apparatus according to one implementation of the technology.

FIG. 2 is a block diagram illustrating an example of a configuration of a manufacturing apparatus 100 according to the example implementation, in which a solid arrow denotes a flow of data. The manufacturing apparatus 100 may include an imaging device 110, an arm 120, and a controller 130.

The imaging device 110 may perform imaging of one or more of the first workpiece Wa, the second workpiece Wb, the shim S, and the arm 120, and thereby generate image data. The imaging device 110 may be able to communicate with the controller 130 by wire or wirelessly, and transmit the generated image data to the controller 130. Note that the manufacturing apparatus 100 according to the example implementation may include the imaging device 110; however, the manufacturing apparatus 100 may include one or more of various sensors instead of or in addition to the imaging device 110 in an alternative example implementation. The sensor may detect a factor of one or more of the first workpiece Wa, the second workpiece Wb, the shim S, and the arm 120. Non-limiting examples of the factor may include a position and a motion.

The arm 120 may be a robot arm or a manipulator, and may be automatically controlled by the controller 130. The arm 120 may perform any of a first insertion process and a second insertion process on the first workpiece Wa and the second workpiece Wb in accordance with a control executed by the controller 130. The first insertion process and the second insertion process are described later in greater detail.

The controller 130 may be a personal computer, for example. The controller 130 may include an input interface 140, a storage 150, and a central controller 160. Note that the controller 130 is not limited to the personal computer. For example, the controller 130 may be a dedicated device or any computable device in an alternative example implementation.

The input interface 140 may be one or more of devices including a mouse, a keyboard, and a touch sensor, for example. The input interface 140 may accept an operation performed by a user, and transmit, to the central controller 160, input information that represents a result of the operation performed by the user.

The storage 150 may be any storage including a hard disk drive (HDD), for example. The storage 150 may contain the statistic data that is obtained as a result of measuring the clearance CL provided between the first workpiece Wa and the second workpiece Wb. The statistic data may be based on an accumulation of measurement results obtained from size measurements of the large number of clearances CL, which are performed in the past on the first workpiece Wa and the second workpiece Wb.

The central controller 160 may be a microcomputer, and may control, in an overall fashion, the controller 130 as a whole. The microcomputer may have devices including a central processing unit (CPU), a read-only memory (ROM) in which pieces of information including a program are stored, and a random-access memory (RAM) that serves as a work area.

The central controller 160 may execute the program to serve as an arm controller 162, a representative value deriving unit 164, a first tester 166, and a second tester 168. In one implementation, the central controller 160 may serve as one or more of a "representative value deriving unit", a "first tester", and a "second tester". The arm controller 162 may analyze the image data transmitted from the imaging device 110, and control the arm 120. For example, the arm controller 162 may cause the arm 120 to operate the shim S or a jig such as a gauge. The arm 120 may be able to operate or move the shim S or the jig while holding the same.

The representative value deriving unit 164 derives the representative value, e.g., the median μ, of the clearance CL from the statistic data stored in the storage 150. The representative value deriving unit 164 may determine whether the derived median μ is less than the tolerance d of the clearance CL. When the median μ is less than the tolerance d of the clearance CL, the representative value deriving unit 164 may transmit, to the first tester 166, a signal indicating that the median μ is less than the tolerance d. When the median μ is greater than the tolerance d of the clearance CL, the representative value deriving unit 164 may transmit, to the second tester 168, a signal indicating that the median μ is greater than the tolerance d. One of the first tester 166 and the second tester 168 may perform its corresponding process when the median μ is equal to the tolerance d of the clearance CL. In the example implementation, without limitation, the second tester 168 may perform its corresponding process when the median μ is equal to the tolerance d of the clearance CL.

The first tester 166 executes the first insertion process when the median μ is less than the tolerance d of the clearance CL. The second tester 168 executes the second insertion process when the median μ is greater than the tolerance d of the clearance CL. Upon executing corresponding one of the first insertion process and the second insertion process, the first tester 166 and the second tester 168 each may specify the shim S or the jig to be used in the corresponding insertion process. The arm controller 162 may execute a specific control of the arm 120 in accordance with instructions received from the first tester 166 or the second tester 168. For example, the arm controller 162 may control a position, an attitude, or any other factor of the arm 120.

In the following, with reference to flowcharts, a description is given of selection of the first and the second insertion processes and specific but non-limiting flows of the first and the second insertion processes.

Figure 3:
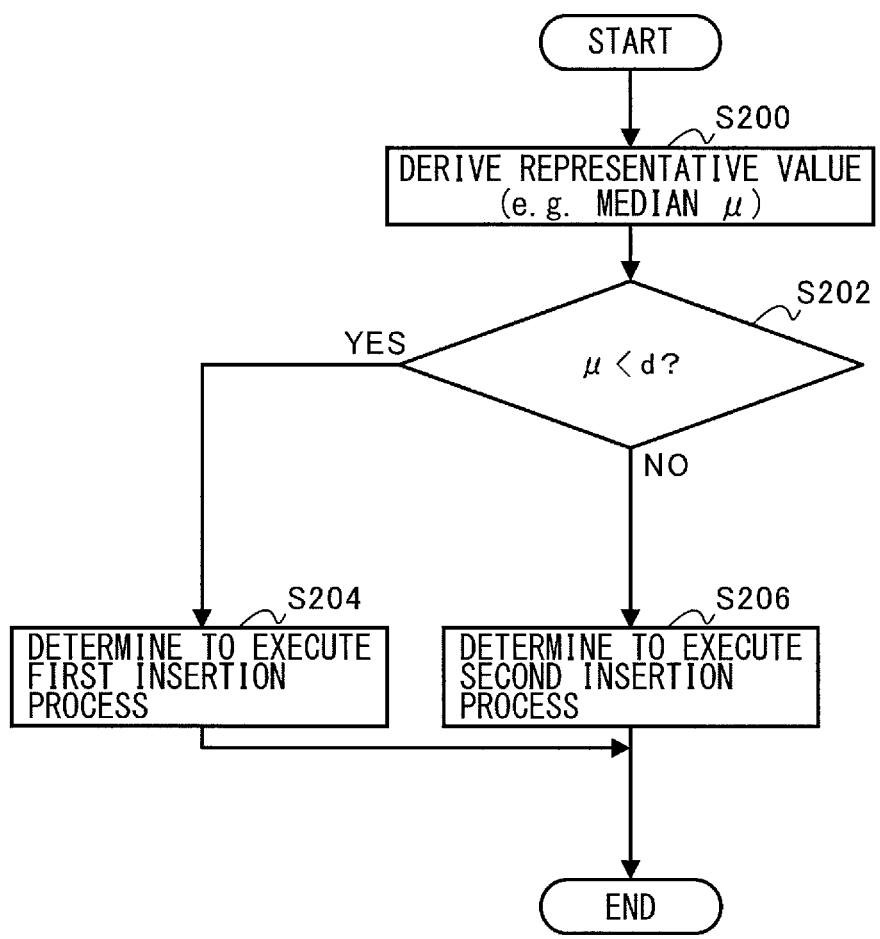
FIG. 3 is a flowchart illustrating an example of a flow of a manufacturing process to be performed by the manufacturing apparatus illustrated in FIG. 2.

FIG. 3 is a flowchart illustrating an example of a flow of a manufacturing process to be performed by the manufacturing apparatus 100. For example, the process illustrated by way of example in FIG. 3 may be performed once before an initial process of fastening the first workpiece Wa and the second workpiece Wb is performed.

[Step S200]

At step S200, the representative value deriving unit 164 derives, from the statistic data stored in the storage 150, the representative value, e.g., the median of the clearance CL provided between the first workpiece Wa and the second workpiece Wb.

[Step S202]

At step S202, the representative value deriving unit 164 may determine whether the derived median μ is less than the tolerance d of the clearance CL. The flow may proceed to step S204 when the median μ is less than the tolerance d (step S202: YES). The flow may proceed to step S206 when the median μ is not less, i.e., equal to or greater than the tolerance d (step S202: NO).

[Step S204]

When the median μ is less than the tolerance d (step S202: YES), at step S204, the representative value deriving unit 164 may determine to execute the first insertion process S300, and notify the first tester 166 of the execution of the first insertion process S300 accordingly. A description on the first insertion process S300 is given later in greater detail.

[Step S206]

When the median μ is not less, i.e., equal to or greater than the tolerance d (step S202: NO), at step S206, the representative value deriving unit 164 may determine to execute the second insertion process S400, and notify the second tester 168 of the execution of the second insertion process S400 accordingly. A description on the second insertion process S400 is given later in greater detail.

Figure 4:
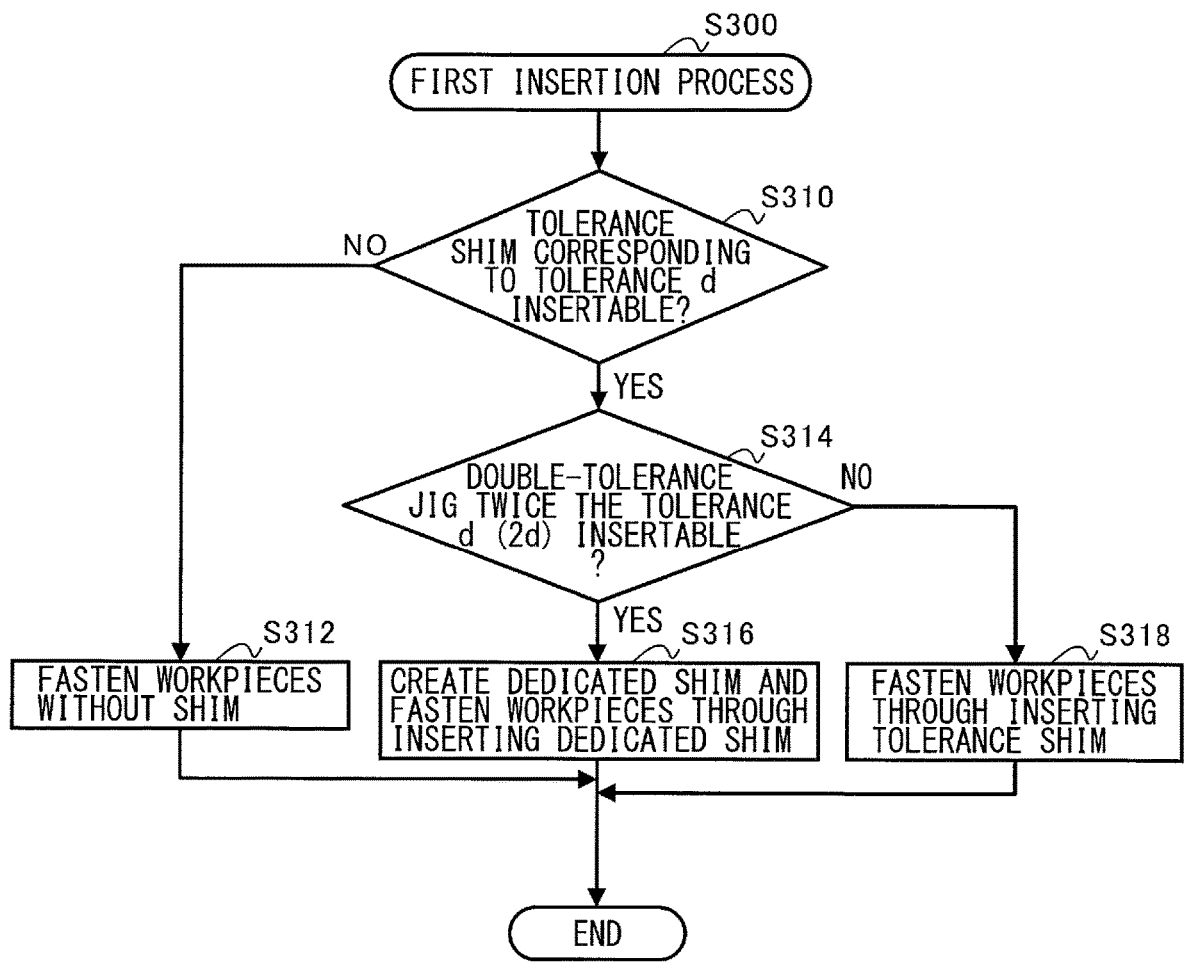
FIG. 4 is a flowchart illustrating an example of a flow of a process performed in accordance with a first insertion process.

FIG. 4 is a flowchart illustrating an example of a flow of a process performed in accordance with the first insertion process S300. For example, the process illustrated by way of example in FIG. 4 may be performed when the representative value deriving unit 164 determines to execute the first insertion process S300 and before the process of fastening the first workpiece Wa and the second workpiece Wb is performed.

[Step S310]

At step S310, the first tester 166 determines whether a tolerance shim is insertable into the clearance CL. As used herein, the term "tolerance shim" refers to the shim S having a thickness corresponding to the tolerance d. The flow may proceed to step S312 when it is difficult or not possible to insert the tolerance shim into the clearance CL (step S310: NO). The flow may proceed to step S314 when the tolerance shim is insertable into the clearance CL (step S310: YES).

In the example implementation, the arm controller 162 may verify whether the tolerance shim is insertable in the determination performed at step S310. For example, in such verification, the arm controller 162 may cause the arm 120 to actually operate the tolerance shim. Note that any known method may be used to perform processes of the arm controller 162 and the arm 120 upon a process of determining the length of the clearance CL by means of the shim S or the jig, and therefore a description on such processes of the arm controller 162 and the arm 120 will not be provided in detail in the following.

[Step S312]

When it is difficult or not possible to insert the tolerance shim into the clearance CL at step S310 (step S310: NO), the first tester 166 may determine, at step S312, to fasten the first workpiece Wa and the second workpiece Wb without inserting the shim S into the clearance CL.

Note that the arm controller 162 may control the arm 120 to fasten the first workpiece Wa and the second workpiece Wb in accordance with the determination on the shim S to be used, or in accordance with the determination as to the execution of the fastening without using the shim S. Here, any known method may be used to fasten the first workpiece Wa and the second workpiece Wb, and therefore a description on the fastening of the first workpiece Wa and the second workpiece Wb will not be provided in detail in the following.

[Step S314]

When the tolerance shim is insertable into the clearance CL at step S310 (step S310: YES), the first tester 166 determines, at step S314, whether a double-tolerance jig is insertable into the clearance CL. As used herein, the term "double-tolerance jig" refers to a jig, such as a gauge, having a thickness twice the tolerance d (i.e., 2d). The flow may proceed to step S316 when the double-tolerance jig is insertable into the clearance CL (step S314: YES). The flow may proceed to step S318 when it is not possible to insert the double-tolerance jig into the clearance CL (step S314: NO).

[Step S316]

When the double-tolerance jig is insertable into the clearance CL at step S314 (step S314: YES), the first tester 166 may determine, at step S316, to create the dedicated shim S that matches with a size of the clearance CL and to fasten the first workpiece Wa and the second workpiece Wb through inserting the dedicated shim S into the clearance CL. Hereinafter, the dedicated shim S that matches with the size of the clearance CL is referred to as a "dedicated shim".

[Step S318]

When it is difficult or not possible to insert the double-tolerance jig into the clearance CL at step S314 (step S314: NO), the first tester 166 may determine, at step S318, to fasten the first workpiece Wa and the second workpiece Wb through inserting the tolerance shim into the clearance CL.

Figure 5:
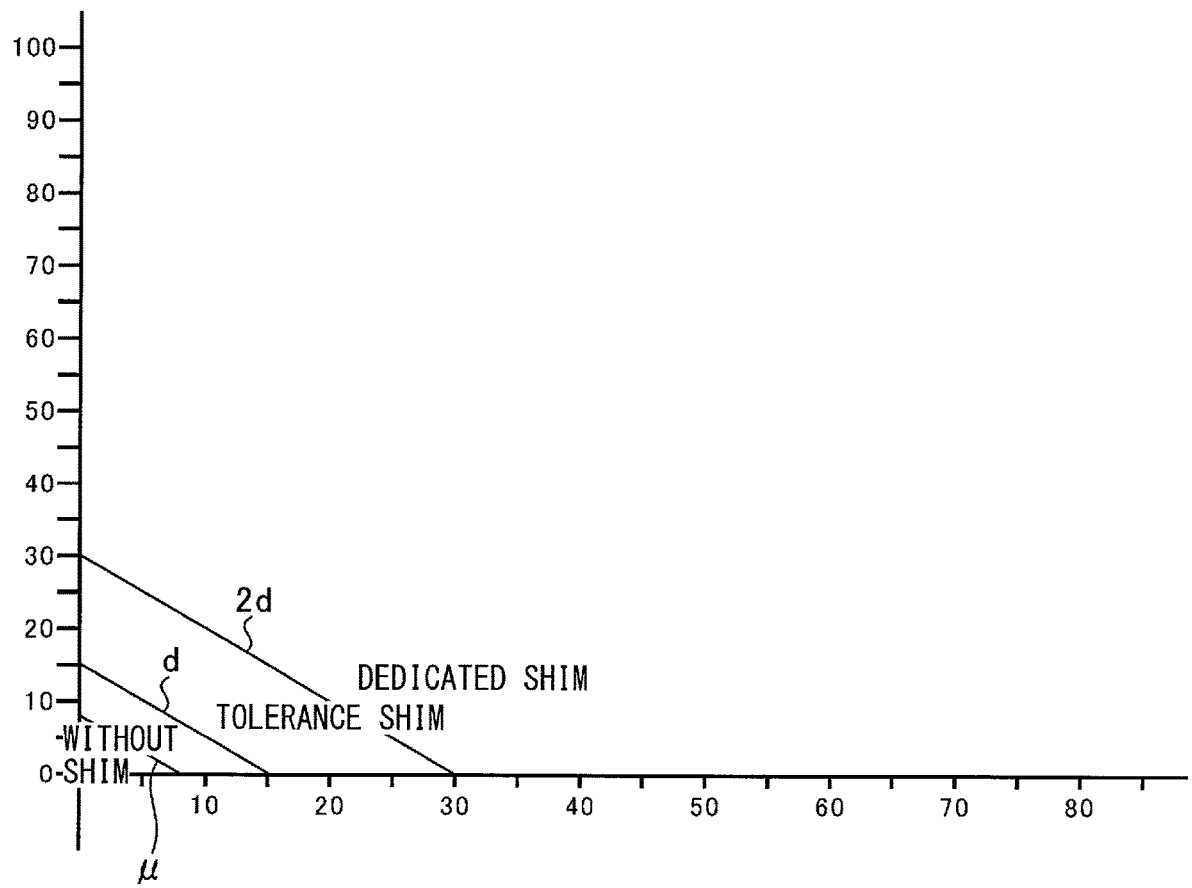
FIG. 5 is a diagram illustrating an example of a relationship between the clearances and the shims according to the first insertion process.

FIG. 5 illustrates an example of a relationship between the clearances CL and the shims S according to the first insertion process S300, in which a vertical axis and a horizontal axis each illustrate a length of the clearance CL. Note that numerical values of respective scale marks illustrated in FIG. 5 are illustrative and non-limiting.

Referring to FIG. 5, the use of the shim S may be unnecessary when the clearance CL is equal to or less than the tolerance d. In addition, the tolerance shim may be used in an example case where the clearance CL is equal to or greater than the tolerance d and equal to or less than 2d, i.e., equal to or less than a value twice the tolerance d. In this case, the tolerance shim may fill the clearance CL, allowing a difference between the clearance CL and the tolerance shim to be equal to or less than the tolerance d. Further, the dedicated shim that matches with a size of the clearance CL may be used in an example case where the clearance CL is greater than 2d, i.e., greater than the value twice the tolerance d. In this case, the dedicated shim may fill the clearance CL, allowing a difference between the clearance CL and the dedicated shim to be equal to or less than the tolerance d.

Assuming that the clearance CL is designed to be equal to or greater than 0 (zero), and that the variation $\sigma$ of the clearance CL is less than the tolerance d ($\sigma < d$) in the statistics data when the variation $\sigma$ of the clearance CL and the tolerance d of the clearance CL are compared with each other, the expression "$\mu + \sigma < d + \sigma < 2d$" holds true, meaning that the $1\sigma$ interval as well as any other interval are covered solely by the tolerance shim. In other words, simply preparing one kind of tolerance shim makes it possible to manufacture 68.27% or more of the entire products. Similarly, it is possible to manufacture 95.55% or more of the entire products when $2\sigma < d$ holds true, and to manufacture 99.73% or more of the entire products when $3\sigma < d$ holds true.

Figure 6:
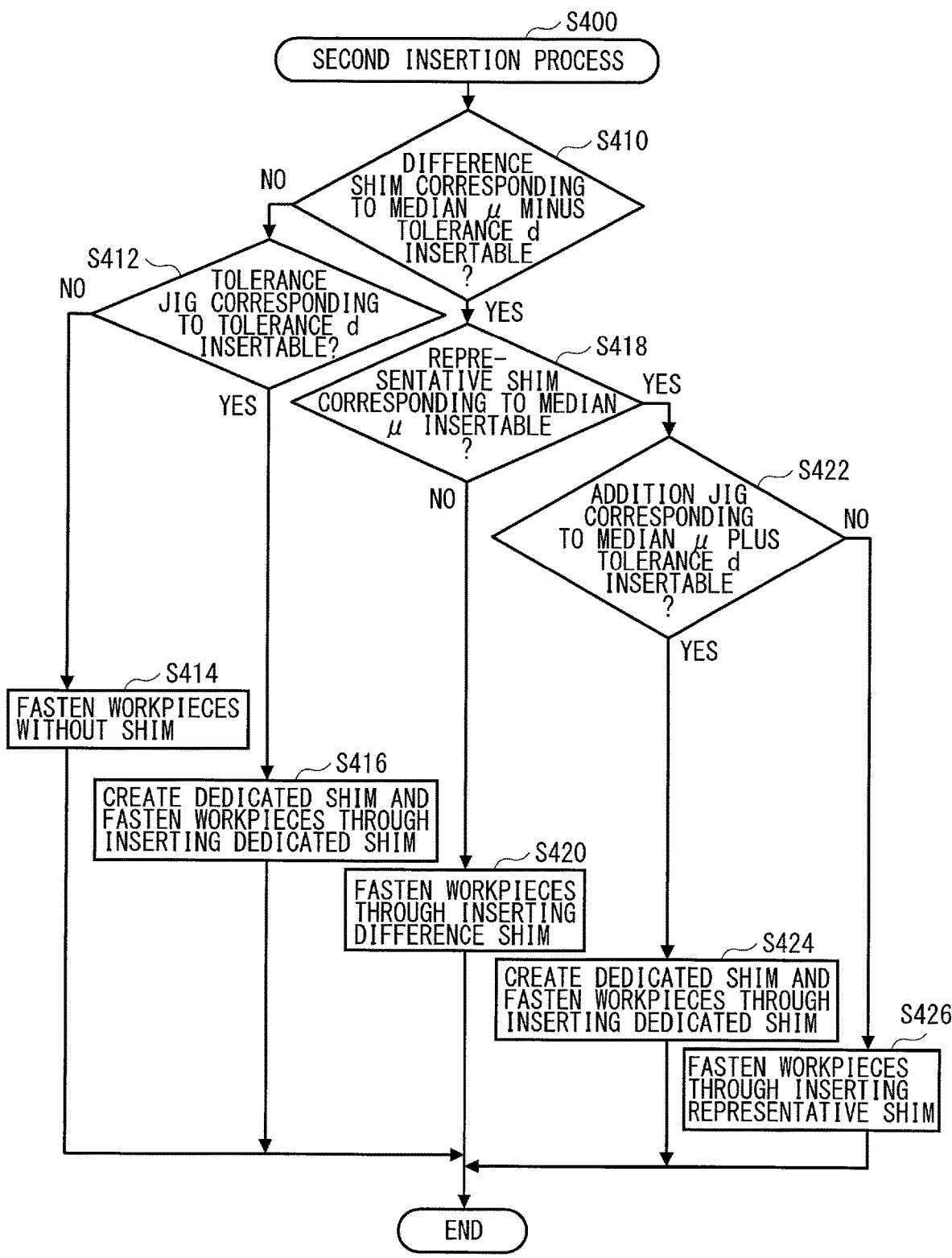
FIG. 6 is a flowchart illustrating an example of a flow of a process performed in accordance with a second insertion process.

FIG. 6 is a flowchart illustrating an example of a flow of a process performed in accordance with the second insertion process S400. For example, the process illustrated by way of example in FIG. 6 may be performed when the representative value deriving unit 164 determines to execute the second insertion process S400 and before the process of fastening the first workpiece Wa and the second workpiece Wb is performed.

[Step S410]

At step S410, the second tester 168 determines whether a difference shim is insertable into the clearance CL. As used herein, the term "difference shim" refers to the shim S having a thickness corresponding to a resultant of subtraction of the tolerance d from the median $\mu$. The flow may proceed to step S412 when it is difficult or not possible to insert the difference shim into the clearance CL (step S410: NO). The flow may proceed to step S418 when the difference shim is insertable into the clearance CL (step S410: YES).

[Step S412]

When it is difficult or not possible to insert the difference shim into the clearance CL at step S410 (step S410: NO), the second tester 168 may determine, at step S412, whether a tolerance jig is insertable into the clearance CL. As used herein, the term "tolerance jig" refers to a jig, such as a gauge, having a thickness corresponding to the tolerance d. The flow may proceed to step S414 when it is difficult or not possible to insert the tolerance jig into the clearance CL (step S412: NO). The flow may proceed to step S416 when the tolerance jig is insertable into the clearance CL (step S412: YES).

[Step S414]

When it is difficult or not possible to insert the tolerance jig into the clearance CL at step S412 (step S412: NO), the second tester 168 may determine, at step S414, to fasten the first workpiece Wa and the second workpiece Wb without inserting the shim S into the clearance CL.

[Step S416]

When the tolerance jig is insertable into the clearance CL at step S412 (step S412: YES), the second tester 168 may determine, at step S416, to create the dedicated shim S that matches with a size of the clearance CL and to fasten the first workpiece Wa and the second workpiece Wb through inserting the dedicated shim S into the clearance CL.

[Step S418]

When the difference shim is insertable into the clearance CL at step S410 (step S410: YES), the second tester 168 determines, at step S418, whether a representative shim is insertable into the clearance CL. As used herein, the term "representative shim" refers to the shim S having a thickness corresponding to the median $\mu$. The flow may proceed to step S420 when it is difficult or not possible to insert the representative shim into the clearance CL (step S418: NO).

The flow may proceed to step S422 when the representative shim is insertable into the clearance CL (step S418: YES).
[Step S420]
When it is difficult or not possible to insert the representative shim into the clearance CL at step S418 (step S418: NO), the second tester 168 may determine, at step S420, to fasten the first workpiece Wa and the second workpiece Wb through inserting the difference shim into the clearance CL.
[Step S422]
When the representative shim is insertable into the clearance CL (step S418: YES), the second tester 168 determines, at step S422, whether an addition jig is insertable into the clearance CL. As used herein, the term "addition jig" refers to a jig, such as a gauge, having a thickness corresponding to a resultant of addition of the tolerance d to the median μ. The flow may proceed to step S424 when the addition jig is insertable into the clearance CL (step S422: YES). The flow may proceed to step S426 when it is difficult or not possible to insert the addition jig into the clearance CL (step S422: NO).
[Step S424]
When the addition jig is insertable into the clearance CL at step S422 (step S422: YES), the second tester 168 may determine, at step S424, to create the dedicated shim S that matches with a size of the clearance CL and to fasten the first workpiece Wa and the second workpiece Wb through inserting the dedicated shim S into the clearance CL.
[Step S426]
When it is difficult or not possible to insert the addition jig into the clearance CL at step S422 (step S422: NO), the second tester 168 may determine, at step S426, to fasten the first workpiece Wa and the second workpiece Wb through inserting the representative shim into the clearance CL.

Figure 7:
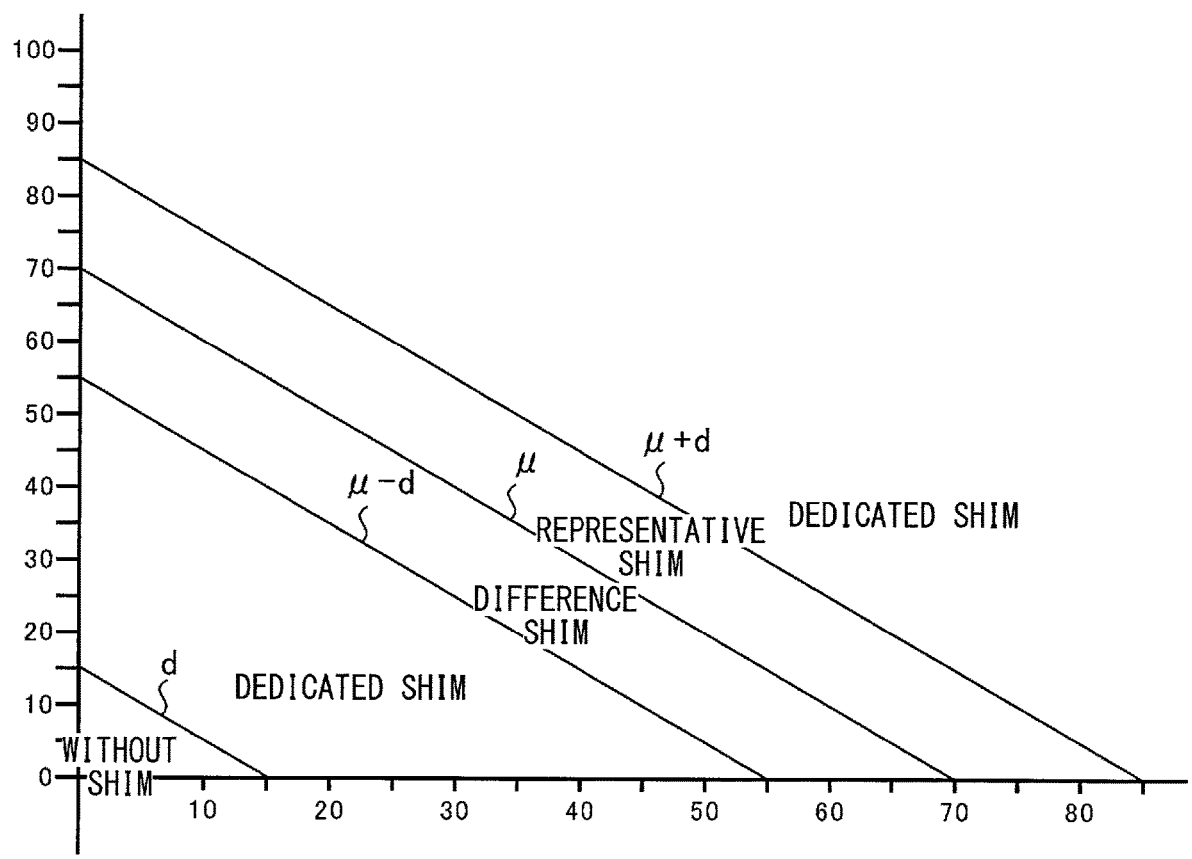
FIG. 7 is a diagram illustrating an example of a relationship between the clearances and the shims according to the second insertion process.

FIG. 7 illustrates an example of a relationship between the clearances CL and the shims S according to the second insertion process S400, in which a vertical axis and a horizontal axis each illustrate a length of the clearance CL. Note that numerical values of respective scale marks illustrated in FIG. 7 are illustrative and non-limiting.

Referring to FIG. 7, the use of the shim S may be unnecessary when the clearance CL is equal to or less than the tolerance d. In addition, the dedicated shim that matches with a size of the clearance CL may be used in an example case where the clearance CL is equal to or greater than the tolerance d and equal to or less than the value in which the tolerance d is subtracted from the median μ. In this case, the dedicated shim may fill the clearance CL, allowing a difference between the clearance CL and the dedicated shim to be equal to or less than the tolerance d.

Further, the difference shim may be used in an example case where the clearance CL is greater than the value in which the tolerance d is subtracted from the median μ and equal to or less than the median μ. In this case, the difference shim may fill the clearance CL, allowing a difference between the clearance CL and the difference shim to be equal to or less than the tolerance d.

Further, the representative shim may be used in an example case where the clearance CL is greater than the median μ and equal to or less than the value in which the tolerance d is added to the median μ. In this case, the representative shim may fill the clearance CL, allowing a difference between the clearance CL and the representative shim to be equal to or less than the tolerance d.

Further, the dedicated shim that matches with a size of the clearance CL may be used in an example case where the clearance CL is greater than the value in which the tolerance d is added to the median μ. In this case, the dedicated shim may fill the clearance CL, allowing a difference between the clearance CL and the dedicated shim to be equal to or less than the tolerance d.

Assuming that the variation σ of the clearance CL is less than the tolerance d (σ<d) in the statistics data when the variation σ of the clearance CL and the tolerance d of the clearance CL are compared with each other, the expression "μ−d<μ−σ<μ<μ+σ<μ+d" holds true, meaning that the 1σ interval as well as any other interval are covered by the difference shim and the representative shim. In other words, simply preparing two kinds of shims S makes it possible to manufacture 68.27% or more of the entire products. Similarly, it is possible to manufacture 95.55% or more of the entire products when 2σ<d holds true, and to manufacture 99.73% or more of the entire products when 3σ<d holds true.

According to the foregoing example implementation, it is possible to keep a rate of fabricating the dedicated shim low owing to the first insertion process S300 and the second insertion process S400, and thereby to reduce operation man-hour.

Further, the shim S becomes unnecessary at a rate of about half or more of the entire products upon manufacturing when the median μ is less than the tolerance d (μ<d). Hence, in this case, the first insertion process S300 may be selected in which the preparation of only one kind of shim S, i.e., the tolerance shim suffices. When the median μ is greater than the tolerance d (μ>d), sometimes the tolerance d may possibly be extremely large with respect to the median μ. Hence, in this case, the second insertion process S400 may be selected in which the two kinds of shims S having their respective thicknesses based on the median μ as a reference.

Accordingly, the first insertion process S300 and the second insertion process S400 are selected on a case-by-case basis through comparing the median μ and the tolerance d. Hence, it is possible to keep the rate of fabricating the dedicated shim lower, and thereby to reduce operation man-hour.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the first insertion process S300 according to the foregoing example implementation, a design value of the thickness of the tolerance shim may be based on a tolerance that tolerates a size smaller than the tolerance d (referred to as a tolerance width x), where the tolerance d is an upper limit. Such an alternative implementation ensures that the difference between the clearance CL and the tolerance shim is equal to or less than the tolerance d when the insertion of the tolerance shim is difficult or not possible.

Further, in the first insertion process S300 according to the foregoing example implementation, a design value of the thickness of the double-tolerance jig may be based on a tolerance that tolerates a size smaller than a value 2d−x, where the value 2d−x is an upper limit. The value 2d−x may be a resultant of subtraction of the tolerance width x of the thickness of the tolerance shim from 2d that is the value twice the tolerance d. Such an alternative example implementation ensures that the difference between the clearance CL and the double-tolerance jig is equal to or less than the tolerance d when the insertion of the double-tolerance jig is difficult or not possible.

The foregoing example implementation has been described by referring to the tolerance of each of the shim S and the jig in the first insertion process S300. In an alternative example implementation, a tolerance may be set also for each of the various shims S and the jigs in the second insertion process S400 to ensure that the difference between the clearance CL and the shim (or the jig) is equal to or less than the tolerance d.

As used herein, the term "not insertable" and its variants not only means that the insertion of any shim or any jig described above into the clearance CL is not possible but also means that the insertion of any shim or any jig described above into the clearance CL is difficult.

The central controller 160 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 160. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the central controller 160 illustrated in FIG. 2.

The invention claimed is:

1. A method comprising:
  deriving, from a clearance measurement measured by a measuring tool, a representative value of a clearance that is provided between a first workpiece and a second workpiece, the first workpiece and the second workpiece eventually structuring an airframe of an aircraft and being configured to be fastened to each other;
  executing a first insertion process that includes
    physically moving a tolerance shim, by a robot arm, towards the clearance to determine whether the tolerance shim is physically insertable into the clearance when the representative value is less than a tolerance of the clearance, the tolerance shim having a thickness corresponding to the tolerance, and
    determining whether a gauge is insertable into the clearance when the tolerance shim is insertable into the clearance, the gauge having a thickness twice the tolerance; and
  executing a second insertion process that includes
    determining whether a difference shim is insertable into the clearance when the representative value is greater than the tolerance, the difference shim having a thickness corresponding to a resultant of subtraction of the tolerance from the representative value,
    determining whether a representative shim is insertable into the clearance when the difference shim is insertable into the clearance, the representative shim having a thickness corresponding to the representative value, and
    determining whether an addition jig is insertable into the clearance when the representative shim is insertable into the clearance, the addition jig having a thickness corresponding to a resultant of addition of the tolerance to the representative value.

2. The method according to claim 1, wherein the executing the first insertion process further comprises fastening the first workpiece and the second workpiece without any shim when the tolerance shim is not insertable into the clearance.

3. The method according to claim 2, wherein the executing the first insertion process further comprises:
  inserting the tolerance shim into the clearance when the gauge is not insertable into the clearance; and
  fastening the first workpiece and the second workpiece with the tolerance shim being inserted into the clearance.

4. The method according to claim 2, wherein the executing the second insertion process further comprises determining whether a tolerance jig is insertable into the clearance when the difference shim is not insertable into the clearance, the tolerance jig having a thickness corresponding to the tolerance.

5. The method according to claim 4, wherein the executing the second insertion process further comprises fastening the first workpiece and the second workpiece without any shim when the tolerance jig is not insertable into the clearance.

6. The method according to claim 2, wherein the executing the second insertion process further comprises:
  inserting the difference shim into the clearance when the representative shim is not insertable into the clearance; and
  fastening the first workpiece and the second workpiece with the difference shim being inserted into the clearance.

7. The method according to claim 2, wherein the executing the second insertion process further comprises:
  inserting the representative shim into the clearance when the addition jig is not insertable into the clearance; and
  fastening the first workpiece and the second workpiece with the representative shim being inserted into the clearance.

8. The method according to claim 1, wherein the executing the first insertion process further comprises:
  inserting the tolerance shim into the clearance when the gauge is not insertable into the clearance; and
  fastening the first workpiece and the second workpiece with the tolerance shim being inserted into the clearance.

9. The method according to claim 1, wherein the executing the second insertion process further comprises determining whether a tolerance jig is insertable into the clearance when the difference shim is not insertable into the clearance, the tolerance jig having a thickness corresponding to the tolerance.

10. The method according to claim 9, wherein the executing the second insertion process further comprises fastening the first workpiece and the second workpiece without any shim when the tolerance jig is not insertable into the clearance.

11. The method according to claim 1, wherein the executing the second insertion process further comprises:
  inserting the difference shim into the clearance when the representative shim is not insertable into the clearance; and fastening the first workpiece and the second workpiece with the difference shim being inserted into the clearance.

12. The method according to claim 1, wherein the executing the second insertion process further comprises:

inserting the representative shim into the clearance when the addition jig is not insertable into the clearance; and fastening the first workpiece and the second workpiece with the representative shim being inserted into the clearance.

* * * * *